United States Patent [19]

Goodman et al.

[11] 4,226,974
[45] Oct. 7, 1980

[54] PROCESS FOR THE REMOVAL OF VINYL CHLORIDE FROM POLYVINYL CHLORIDE LATEXES AND SLURRIES

[75] Inventors: Donald Goodman, Flemington; Marvin Koral, Warren; Robert S. Miller, Bridgewater; Robert J. Stanaback, Gladstone, all of N.J.

[73] Assignee: Tenneco Chemicals, Inc., Saddle Brook, N.J.

[21] Appl. No.: 761,109

[22] Filed: Jan. 21, 1977

Related U.S. Application Data

[62] Division of Ser. No. 604,281, Aug. 13, 1975.

[51] Int. Cl.³ .......................... C08F 6/24; C08F 6/16; C08F 2/20
[52] U.S. Cl. .................................. 528/483; 526/200; 528/490; 528/501
[58] Field of Search ...................... 528/480, 483, 490; 526/344, 345

[56] References Cited

U.S. PATENT DOCUMENTS

| | | | |
|---|---|---|---|
| 3,522,227 | 7/1970 | Thomas | 526/344 |
| 3,622,553 | 11/1971 | Cines | 526/344 X |
| 3,956,249 | 5/1976 | Goodman | 528/500 |

FOREIGN PATENT DOCUMENTS

| | | | |
|---|---|---|---|
| 957799 | 11/1974 | Canada . | |
| 2162860 | 7/1972 | Fed. Rep. of Germany | 528/483 |
| 2331895 | 1/1974 | Fed. Rep. of Germany | 528/483 |
| 1446585 | 8/1976 | United Kingdom . | |

*Primary Examiner*—C. A. Henderson
*Attorney, Agent, or Firm*—Evelyn Berlow

[57] ABSTRACT

Vinyl chloride is removed from polyvinyl chloride dispersions, latexes, and slurries by sparging them with an inorganic gas, such as air or ammonia, while they are maintained at subatmospheric pressure.

1 Claim, No Drawings

PROCESS FOR THE REMOVAL OF VINYL CHLORIDE FROM POLYVINYL CHLORIDE LATEXES AND SLURRIES

This is a division of our copending application Ser. No. 604,281, which was filed on Aug. 13, 1975.

This invention relates to a process for the purification of polyvinyl chloride. More particularly, it relates to a process for the removal of residual vinyl chloride from polyvinyl chloride dispersions, latexes, and slurries.

When vinyl chloride is polymerized in an aqueous medium by suspension or emulsion polymerization techniques, there is obtained a dispersion, latex, or slurry that contains from 5% to 50% by weight, and in lmost cases from 15% to 40% by weight of polyvinyl chloride. It also contains up to 5% by weight of residual vinyl chloride. Most of the unreacted monomer is usually removed by heating the dispersion, latex, or slurry under reduced pressure to about 65° C. As it is ordinarily practiced, this stripping procedure reduces the monomer content to about 1000 ppm to 20,000 ppm. Further processing yields dried products that may contain 500 ppm or more of monomer.

In view of the recently-developed safety standards that require that the amount of vinyl chloride in polyvinyl chloride and in the atmosphere that workers breathe be maintained at very low levels, it is necessary that the monomer content of the dispersion, latex, or slurry be sufficiently reduced so that these requirements can be met.

A number of procedures for the removal of residual monomer from polyvinyl chloride dispersions, latexes, and slurries have been proposed, but none has proven to be entirely satisfactory. Procedures that involve heating them to temperatures above 65° C. or subjecting them to conditions of high shear are effective in reducing the vinyl chloride content to low levels, but have an adverse effect on the stability and filterability of the dispersion or latex and on the functional performance of the dried product. In addition, the foaming that often occurs at elevated temperatures creates serious processing problems. Other procedures, for example, sparging with an inert gas or low temperature stripping, either do not reduce the monomer content to the desired very low level or are too slow to be practiced commercially.

In accordance with this invention, an improved process has been developed for the removal of residual monomer from polyvinyl chloride dispersions, latexes, and slurries. This process rapidly reduces the vinyl chloride content of the dispersion, latex, or slurry without affecting its stability and other properties or the properties of the dried polymer. Unlike many of the previously-known monomer removal procedures, the process of this invention does not destabilize the dispersion, latex, or slurry thereby changing the particle size distribution of the polyvinyl chloride and so does not have a detrimental effect on the filterability of the dispersion, latex, or slurry or on the handling and drying characteristics of the wet polymer cake.

In the process of this invention, a dispersion, latex, or slurry that contains from 5% to 50% by weight of polyvinyl chloride and from 1000 parts to 20,000 parts by weight of vinyl chloride per million parts by weight of the dispersion, latex, or slurry is maintained under subatmospheric pressure while it is sparged with an inorganic gas. Following this treatment, the dispersion, latex, or slurry is further processed to yield a solid product that contains less than 10 ppm and in most cases less than 1 ppm of vinyl chloride. The monomer and the sparging material are removed through the vacuum system. They may, if desired, be recovered and recycled.

During the removal of vinyl chloride by the process of this invention, the dispersion, latex, or slurry is maintained at a temperature between about 20° C. and the temperature at which its properties are adversely affected or at which the water in it will boil and at a pressure between about 100 mm. and 600 mm. mercury absolute, preferably at a pressure between 125 mm. and 500 mm. mercury absolute.

The sparging may be carried out by any procedure that will provide maximum contact between the polyvinyl chloride particles and the sparging material. It is preferably done by passing the sparging material through one or more diffusers that are located beneath the surface of the dispersion, latex, or slurry.

The sparging materials that are used to remove vinyl chloride from polyvinyl chloride dispersions, latexes, and slurries are inorganic gases that do not react with any of the components of the dispersion, latex, or slurry and that can be recovered readily from the exit gas stream. Examples of such gases are air, ammonia, and carbon dioxide.

The amount of the sparging material that is used and the rate at which it is introduced are those that will effect rapid removal of vinyl chloride without causing foaming or handling problems. They are dependent upon such factors as the amount of dispersion, latex, or slurry that is being purified, its vinyl chloride content, and the processing conditions that are employed. The optimum amount of sparging material and the optimum sparging rate for each dispersion, latex, or slurry and for each set of processing conditions can be readily determined by carrying out a few preliminary experiments.

In a preferred embodiment of the invention, the process of this invention is used to remove vinyl chloride from dispersions and latexes that contain polyvinyl chloride particles that range in size from about 0.01 micron to 5 microns, and preferably from 0.05 micron to 2 microns. These dispersions and latexes cannot be subjected to procedures that involve heating them to temperatures above 65° C. because such treatment has a deleterious effect on their stability, physical properties, and filterability and on the quality of the dried polymer. In addition, foaming that occurs at elevated temperatures creates serious processing problems. These dispersions and latexes are preferably maintained at a temperature between 40° C. and 60° C. and at a pressure between 100 mm. and 500 mm. mercury absolute while they are sparged with an inorganic gas. Particularly advantageous results have been obtained when the dispersion or latex was maintained at a temperature between 45° C. and 55° C. and at a pressure between 125 mm. and 400 mm. mercury absolute while it was sparged with ammonia.

In another preferred embodiment of the invention, the process is used to remove vinyl chloride from aqueous slurries that contain polyvinyl chloride particles ranging in size from about 5 microns to 200 microns. The slurries are preferably maintained at a temperature between about 60° C. and their boiling points and at a pressure between 100 mm. to 600 mm. mercury absolute while they are being sparged. It is particularly preferred that the slurries be maintained at a temperature between 70° C. and their boiling points at a pressure between 400 mm. to 500 mm. mercury absolute while they are being sparged with air.

As used herein, the term "polyvinyl chloride" includes both the high molecular weight homopolymers of vinyl chloride and the high molecular weight copolymers formed by the copolymerization of vinyl chloride with an essentially water-insoluble ethylenically-unsaturated monomer that is copolymerizable therewith. Suitable comonomers include vinyl acetate, vinyl propionate, vinyl butyrate, vinyl stearate, vinyl benzoate, ethylene, propylene, ethyl acrylate, acrylic acid, acrylamide, acrylonitrile, methacrylonitrile, vinylidene chloride, dialkyl fumarates and maleates, vinyl ethers, and the like. When one or more of these comonomers are used, the monomer component contains at least 70% and preferably 80% to 90% of vinyl chloride.

The polyvinyl chloride dispersions, latexes, and slurries that are treated in accordance with the process of this invention to remove residual vinyl chloride from them may be prepared by the well-known suspension or emulsion polymerization processes. In the suspension polymerization processes, the monomer is suspended in water by a suspending agent and agitation. The polymerization is initiated with a suitable free radical generating polymerization initiator, such as lauroyl peroxide, benzoyl peroxide, diisopropyl peroxydicarbonate, di-2-ethylhexyl peroxydicarbonate, tertiary butyl peroxypivalate, azobisisobutyronitrile, azobis-2,4-dimethylvaleronitrile, and mixtures thereof. Suspending agents that may be used include methylcellulose, hydroxymethylcellulose, hydroxyethylcellulose, hydrolyzed polyvinyl acetate, gelatin, methyl vinyl ethyl-maleic anhydride copolymers, and the like. In emulsion polymerization processes, the polymerization initiator may be hydrogen peroxide, an organic peroxide, a persulfate, or a redox system. Surface-active agents, such as alkyl sulfates, alkane sulfonates, alkyl aryl sulfonates, and fatty acid soaps are used as emulsifiers in these processes. A preferred method of preparing these polymers is described in U.S. Pat. No. 2,981,722. The reaction mixtures produced by these processes are usually heated under vacuum to about 60° C. to 65° C. to remove most of the unreacted monomer from them. The resulting stripped dispersions, latexes, and slurries generally contain 5% to 50% and preferably 15% to 40% by weight of polyvinyl chloride as particles that range in size from about 0.01 micron to 200 microns and from about 1000 ppm to 20,000 ppm of vinyl chloride. Following the removal of vinyl chloride from them by the process of this invention, the dispersion, latex, or slurry may be dewatered, for example, on a rotary drum filter, and then dried, or it may be spray dried. The polyvinyl chloride prepared in this way has a vinyl chloride content of less than 10 ppm, and in many cases less than 1 ppm. It can be further processed without creating a health hazard.

The invention is further illustrated by the following examples.

EXAMPLES 1 AND 2

An aqueous dispersion containing vinyl chloride, a mixture of lauroyl peroxide and di-2-ethylhexyl peroxydicarbonate as the initiator, ammonium oleate as the emulsifier, and methylcellulose as the suspending agent was homogenized and then polymerized to form a latex or dispersion containing between 30% and 33% of polyvinyl chloride in the form of particles ranging in size from 0.05 micron to 5 microns. The latex or dispersion was heated under vacuum at a temperature below 65° C. to reduce its vinyl chloride content to less than 10,000 parts per million.

One thousand gram portions of the dispersion were maintained at 45° C. and 230 mm Hg absolute while they were sparged with air or ammonia at the rate of 0.22 cubic feet per hour. Samples were taken periodically and analyzed to determine their monomer content. The results obtained are given in Table I.

Vinyl chloride was recovered from the exit gas and recycled. The treated latexes or dispersions were filtered and dewatered. Each of the dried products contained less than 10 ppm of vinyl chloride.

For comparative purposes, 1000 gram portions of the same dispersion were either sparged with a gas at atmospheric pressure or subjected to subatmospheric pressure. Samples were taken periodically and analyzed to determine the amount of monomer that was present. The conditions employed and the results obtained are given in Table I.

From the data in Table I, it will be seen that the process of this invention is substantially more effective than either vacuum treatment or sparging at atmospheric pressure in removing vinyl chloride from a polyvinyl chloride latex or dispersion.

TABLE I

| | Sparge Gas | Temp. °C. | Pressure mm Hg. Absolute | % of Vinyl Chloride Removed in Indicated Time | | | | |
|---|---|---|---|---|---|---|---|---|
| | | | | 2 Hrs. | 4 Hrs. | 5 Hrs. | 16 Hrs. | 23 Hrs. |
| Ex. No. | | | | | | | | |
| 1 | Air | 45 | 230 | 92.4 | — | 99.4 | — | — |
| 2 | NH₃ | 45 | 230 | 88.4 | 97.6 | 99.2 | — | — |
| Comp. Ex. | | | | | | | | |
| A | Air | 45 | 760 | 43.0 | — | 54.1 | 81.9 | 89.4 |
| B | NH₃ | 45 | 760 | 61.3 | — | 79.2 | — | 89.9 |
| C | N₂ | 45 | 760 | 48.8 | — | 66.3 | — | 96.4 |
| D | None | 45 | 230 | 76.1 | — | 81.3 | 94.4 | — |

EXAMPLES 3 AND 4

An aqueous slurry of polyvinyl chloride was prepared by polymerizing vinyl chloride using a mixture of lauroyl peroxide and di-2-ethylhexyl peroxydicarbonate as the initiator, hydroxypropylmethylcellulose as the suspending agent, and trichloroethylene as the chain transfer agent.

One thousand gram portions of the slurry in 2-liter flasks were maintained at 75° C. and at 400 mm mercury absolute while they were sparged with air. For comparative purposes, portions of the slurry were sparged with air at atmospheric pressure or subjected to subatmospheric pressure without sparging.

The conditions employed and the results obtained are given in Table II.

TABLE II

| Example No. | Temp °C. | Pressure mm Hg Absolute | Sparge Rate Cu ft/hr. | Vinyl Chloride Content (ppm) of Dried Polyvinyl Chloride After Indicated Time | | |
|---|---|---|---|---|---|---|
| | | | | 0 Hrs. | 2 Hrs. | 4 Hrs. |
| 3 | 75 | 400 | 2 | 2240 | 41 | 1.1 |
| 4 | 75 | 400 | 1 | 1940 | 23 | 0.7 |

TABLE II-continued

| Example No. | Temp °C. | Pressure mm Hg Absolute | Sparge Rate Cu ft/hr. | Vinyl Chloride Content (ppm) of Dried Polyvinyl Chloride After Indicated Time | | |
|---|---|---|---|---|---|---|
| | | | | 0 Hrs. | 2 Hrs. | 4 Hrs. |
| Comparative Example No. | | | | | | |
| E | 75 | 760 | 2 | 2680 | 52 | 3.3 |
| F | 75 | 760 | 1 | 2840 | 37 | 6.6 |
| G | 75 | 400 | 0 | 4120 | 350 | 20.0 |

What is claimed is:

1. The process for the removal of vinyl chloride from an aqueous dispersion, latex, or slurry that contains from about 1000 parts to 20,000 parts by weight of vinyl chloride per million parts by weight of said dispersion, latex, or slurry and from 5% to 50% by weight of a vinyl chloride polymer selected from the group consisting of polyvinyl chloride and copolymers of vinyl chloride and at least one monomer copolymerizable therewith that comprises maintaining the dispersion, latex, or slurry at subatmospheric pressure while sparging it with ammonia until the dispersion, latex, or slurry contains less than about 10 parts by weight of vinyl chloride per million part by weight of said vinyl chloride polymer.

* * * * *